US011014504B2

(12) United States Patent
Specht et al.

(10) Patent No.: US 11,014,504 B2
(45) Date of Patent: May 25, 2021

(54) HOLDER DEVICE FOR A VEHICLE INTERIOR AND METHOD FOR DAMPING A MOVEMENT OF A RECEIVING SECTION OF A HOLDER DEVICE

(71) Applicant: HS Products Engineering GmbH, Maisach (DE)

(72) Inventors: Martin Specht, Feldafing (DE); Dietmar Christian Huber, Weilheim (DE)

(73) Assignee: HS Products Engineering GmbH, Maisach (DE)

( * ) Notice: Subject to any disclaimer, the term of this patent is extended or adjusted under 35 U.S.C. 154(b) by 0 days.

(21) Appl. No.: 16/316,638

(22) PCT Filed: Jul. 7, 2017

(86) PCT No.: PCT/EP2017/067050
§ 371 (c)(1),
(2) Date: Jan. 10, 2019

(87) PCT Pub. No.: WO2018/011068
PCT Pub. Date: Jan. 18, 2018

(65) Prior Publication Data
US 2020/0180488 A1 Jun. 11, 2020

(30) Foreign Application Priority Data

Jul. 12, 2016 (DE) .................... 10 2016 112 747.7

(51) Int. Cl.
*B60R 7/04* (2006.01)
*B60R 7/06* (2006.01)
(Continued)

(52) U.S. Cl.
CPC ................ *B60R 7/06* (2013.01); *B60N 3/102* (2013.01); *B60R 7/04* (2013.01); *F16H 57/0006* (2013.01); *F16H 2057/0012* (2013.01)

(58) Field of Classification Search
CPC .................................. B60R 7/04; B60R 7/706
(Continued)

(56) References Cited

U.S. PATENT DOCUMENTS

| 4,812,838 A | 3/1989 | Tashiro et al. |
| 5,060,899 A | 10/1991 | Lorence et al. |

(Continued)

FOREIGN PATENT DOCUMENTS

| DE | 195 07 614 A1 | 9/1996 |
| DE | 199 63 202 A1 | 6/2001 |

(Continued)

*Primary Examiner* — Dennis H Pedder
(74) *Attorney, Agent, or Firm* — Vorys, Sater, Seymour and Pease LLP; Anthony Venturino (57) ABSTRACT

Provided is a receiving device for a vehicle interior, having a receiving section for receiving objects in a receiving position of the receiving section, a base body in which the receiving section is arranged in a rest position of the receiving section, a drive unit for moving the receiving section from the rest position via an intermediate position into the receiving position, in which the receiving section projects from the base body, the drive unit applying a first drive force to the receiving section for moving from the rest position into the intermediate position and applying a second drive force to the receiving section for moving from the intermediate position into the receiving position, the first drive force being smaller than the second drive force, further comprising a damping device for applying a first damping force against said first driving force and a second damping (Continued)

force against said second driving force to said receiving portion, said second damping force being greater than said first damping force.

11 Claims, 5 Drawing Sheets

(51) Int. Cl.
*B60N 3/10* (2006.01)
*F16H 57/00* (2012.01)

(58) Field of Classification Search
USPC ....... 296/37.8, 37.9, 37.12, 37.16; 248/311.2
See application file for complete search history.

(56) References Cited

U.S. PATENT DOCUMENTS

| | | | |
|---|---|---|---|
| 5,692,718 A | 12/1997 | Bieck | |
| 6,464,187 B1* | 10/2002 | Bieck | B60N 3/102 |
| | | | 224/926 |
| 8,757,571 B2* | 6/2014 | Shimajiri | B60N 3/106 |
| | | | 248/311.2 |
| 2003/0025058 A1 | 2/2003 | Dieringer et al. | |
| 2009/0292425 A1 | 11/2009 | Nagata et al. | |
| 2016/0059761 A1* | 3/2016 | Bohlke | B60N 2/757 |
| | | | 296/37.8 |

FOREIGN PATENT DOCUMENTS

| | | |
|---|---|---|
| DE | 10 2010 001 025 A1 | 7/2010 |
| EP | 1 281 567 A2 | 2/2003 |
| WO | 2006/063195 A2 | 6/2006 |

* cited by examiner

HOLDER DEVICE FOR A VEHICLE INTERIOR AND METHOD FOR DAMPING A MOVEMENT OF A RECEIVING SECTION OF A HOLDER DEVICE

The present invention relates to a receiving device for a vehicle interior, comprising a receiving section for receiving objects in a receiving position of the receiving section, a base body in which the receiving section is arranged in a rest position of the receiving section, a drive unit for moving the receiving section from the rest position via an intermediate position into the receiving position, in which the receiving section projects from the base body, the drive unit applying a first drive force to the receiving section for moving from the rest position into the intermediate position and applying a second drive force to the receiving section for moving from the intermediate position into the receiving position, the first drive force being smaller than the second drive force. Furthermore, the invention relates to a method for damping the movement of a receiving section of a receiving device for a vehicle interior.

Receiving devices for objects, such as beverage cups or bottles, in a vehicle interior are widely known. Such receiving devices can, for example, be configured as an extendable insertion element, whereby a receiving section is moved out of a base body of the receiving device in order to enable the respective object to be received. This allows a particularly space-saving and user-friendly design of a receiving device to be provided, as the receiving section only protrudes into the interior of the vehicle and is accessible from it when it is needed. At all other times, the receiving section shall preferably remain completely interior the body of the receiving device.

A disadvantage of known receiving devices has been found to be that the speed of movement of the receiving section often increases particularly significantly towards the end of the extension movement. This is usually perceived as unpleasant by a user. This increase can be caused, for example, by the fact that, in order to increase the arrangement height of the receiving device, a spring-loaded receiving base, for example, is folded down when it is extended, particularly in the case of receiving devices for beverages. This can increase the total drive force acting on the receiving section, which in turn increases the speed of the extension movement.

It is the object of the present invention to at least partially eliminate the disadvantages described above. In particular, it is the object of the present invention to improve in a cost-effective and simple manner at least one receiving device for a vehicle interior and a method for damping a movement of a receiving section of such a receiving device, in particular to provide improved damping of a movement of the receiving section and preferably a uniform extension movement of the receiving section.

The foregoing object is solved by a receiving device with the features of claim 1 and a method with the features of claim 16. Further features and details of the invention result from the dependent claims, the description and the drawings. Features and details which are described in connection with the inventors invention are, of course, also valid in connection with the invention method and vice versa, so that with regard to the disclosure of the individual aspects of the invention, reference is or can always be made to each other.

According to a first aspect of the invention, the object is solved by a receiving device for a vehicle interior, comprising a receiving portion for receiving objects in a receiving position of the receiving portion, a base body in which the receiving portion is arranged in a rest position of the receiving portion, a drive unit for moving the receiving portion from the rest position via an intermediate position into the receiving position in which the receiving portion protrudes from the base body, wherein the drive unit applies a first driving force to the receiving section for moving from the rest position into the intermediate position and a second driving force to the moving from the intermediate position into the receiving position, wherein the first driving force is smaller than the second driving force, further comprising a damping device for applying a first damping force against the first driving force and a second damping force against the second driving force to the receiving section, wherein the second damping force is larger than the first damping force.

A device based on an invention can be used to place objects interior a vehicle, in particular a motor vehicle, for example. Such objects may be preferred, for example, containers for beverages such as cups or bottles. The object to be picked up is arranged in a receiving section of the receiving device, which preferably enables the object to be picked up safely due to its shape and/or existing fixing elements. For example, the receiving section can have an at least essentially circular opening into which an object, preferably a conical object such as a cup, can be easily arranged and held in place. An additional receiving floor, which at least partially closes off a receiving space of the receiving section from below, can further increase the safety of arranging objects in the receiving section. This receiving functionality is provided by the receiving section when it is in its receiving position where it protrudes from a body of the receiving device. In other words, the receiving section protrudes into the vehicle interior in its receiving position.

Contrary to this, the receiving section is arranged in its resting position in the base body. Preferably, the receiving section in its resting position is arranged completely interior the body, so that the receiving section in this position does not protrude into the vehicle interior and, in particular, not only partially. Preferably, the receiving portion may be provided with a closure surface which, at a receiving portion in its rest position, flushly continues and/or optically matches a surface of the vehicle interior adjacent to the receiving device. Such a configuration is usually perceived by the user as pleasant and of particularly high quality.

In order to be able to provide automated movement of the receiving section at least from its rest position to its reception position, an inventive receiving device further comprises a drive unit, the drive unit being configured to generate a driving force. The drive unit can, for example, have one or more spring elements as power accumulators. It is also possible to configure the drive unit with one or more electric, pneumatic or hydraulic motors, for example. The drive unit is mechanically connected to the receiving section in such a way that the driving force can be applied to the receiving section. The drive force and/or the mechanical active connection are preferably configured in such a way that the drive unit only drives the receiving section when moving from the rest position to the receiving position. This drive force allows the receiving section to be moved from its rest position via an intermediate position to its receiving position. In other words, the intermediate position is occupied by the receiving section at least briefly during the movement from the rest position to the receiving position, whereby in the intermediate position the receiving section is no longer completely arranged in the base body but also does not yet protrude completely from the base body.

In accordance with the invention, it is provided that the receiving section is acted upon by the drive unit with a first drive force for moving from the rest position into the intermediate position, and that the receiving section is acted upon by the drive unit with a second drive force for moving from the intermediate position into the receiving position. It is essential that the second driving force is greater than the first driving force. This may occur, for example, when the receiving portion is driven from its rest position to its receiving position by a first part of the drive unit which generates a part of the driving force, and when the intermediate position is reached, a second part of the drive unit which also generates a further part of the driving force is added. Thus, the total second driving force acting on the receiving section between the intermediate position and the receiving position and composed of both parts is automatically greater than the first driving force acting on the receiving section between the rest position and the intermediate position. Such an addition can be created, for example, by folding down a receiving base by means of a spring element, whereby this folding down begins with reaching the intermediate position through the receiving section and whereby the receiving base, at least indirectly, is preferably supported by the base body when folding down. Without further measures or devices, this could lead to an increase in the speed of movement of the receiving section between the intermediate position and the receiving position, in particular the greater second driving force. This can cause the receiving section to jump out into its receiving position, which is often perceived as unpleasant and inferior by a user on its own. The receiving section is also abruptly stopped when the receiving position is reached, which, in addition to noise generation, could also cause a high material load and thus a reduced service life or a high susceptibility to maintenance.

In order to avoid this, an invented receiving device has a damping device which is configured to apply a damping force against the driving force to the receiving section. In accordance with the invention, the damping device applies a first damping force against the first driving force and a second damping force against the second driving force to the receiving section. Thus both the respective driving force and the respective damping force act on the receiving section, whereby the forces counteract each other. The respective driving force is preferably greater than the respective damping force, whereby the movement of the receiving section is not completely stopped by the effect of the respective damping force. A resulting total force is thus reduced, whereby the receiving section for its movement is nevertheless driven as a whole. For example, with an antiparallel configuration of the respective driving force and the respective damping force, the resulting total force results from the difference between the two forces. Antiparallel in the sense of the invention means, in particular, that the corresponding forces are arranged parallel to each other, but their directions are opposite to each other.

It is essential for the invention that the second damping force is greater than the first damping force. This enables to take into account the fact that the second driving force is also greater than the first driving force. The movement of the receiving section from the intermediate position to the receiving position, which is caused by the application of the stronger second driving force, is thus damped more strongly by the second, also stronger damping force than the movement of the receiving section from the rest position to the intermediate position, which is caused by the application of the weaker first driving force and which is damped by the first, also weaker damping force. This allows the receiving section to be extended more evenly over the entire movement, i.e. from the rest position to the receiving position. A rushing out of the receiving section towards the end of this movement, as described above together with the associated disadvantages, can thus be safely avoided. All in all, a receiving device can thus be provided which has a long service life and low maintenance susceptibility and is also perceived by a user as particularly pleasant and valuable.

Furthermore, in the case of a receiving device according to the invention, it may be provided that the drive unit has a first drive element and a second drive element, in particular a first and a second spring element, wherein the first drive element acts on the receiving section at least with the first drive force and the second drive element acts on the receiving section with the second drive force. Such a two-part configuration of the drive unit with two separate drive elements enables to particularly easy provide that the first and second drive forces are different and act in particular for different sections of the movement of the receiving section from the rest position via the intermediate position into the receiving position. The drive elements may preferably include spring elements, such as roller springs or spiral springs. It may also be provided that the first drive element also applies a driving force to the receiving section between the intermediate position and the receiving position, which together with the additional force of the second drive element then forms the second driving force. This also particularly enables easy to ensure that the second drive force is greater than the first drive force.

Preference may be given to an inventive receiving device such that the first damping force is zero or at least substantially zero. In this way it can be achieved that the receiving section can be moved between the rest position and the intermediate position without or at least without significant damping. This is particularly advantageous as the receiving section between the rest position and the intermediate position is only subjected to the smaller first drive force. An additional damping of this movement, which, generated by the smaller driving force, is automatically slower than the movement between the intermediate position and the pickup position, can be avoided by comparison. Furthermore, in particular the damping device of a receiving device according to the invention can be configured in a simplified way, since it then only has to provide or generate the second damping force.

It may be particularly preferred, in the case of a holding device which is in accordance with the invention, that the second damping force compensates or at least substantially compensates for the increase in force from the first driving force to the second driving force. As mentioned above, the damping force acting against the driving force reduces the total resulting force applied to the receiving section to produce a movement. By means of a second damping force, which compensates or at least substantially compensates for the increase in force from the first driving force to the second driving force, it can now be achieved in particular that this resulting force, with which the receiving section is acted upon in order to generate a movement, remains preferably constant or at least substantially constant over the entire movement of the receiving section, that is to say from the rest position into the receiving position. Especially at the intermediate position there is no sudden increase of the resulting force due to this configuration of the second damping force. A magnitude of the second damping force can also be selected in such a way that a possible first damping force is taken into account. A particularly even extension of the receiving section from the rest position to the receiving position can thus be provided.

Furthermore, an inventive receiving device can be configured such that the damping device is configured in two parts and has a movement element for following a movement of the receiving section and a damping element for generating the first damping force and/or second damping force, the movement element being arranged on the receiving section and thereby following a movement of the receiving section, and the damping element being arranged in the base body and being mechanically operatively connected to the movement element in such a way that the damping element acts on the receiving section with the generated first and/or second damping force. Such a two-part damping device enables to particularly simply configure. The damping element is arranged in the base body, in particular fixed in the base body. Thus, for example, the base body can be used to support the damping force. This can also prevent the damping element from moving along with the receiving section. Restrictions in the planning and construction of the damping element which would cause such a co-movement can thus be avoided. A configuration of the damping element which is enabled by the arrangement of the damping element in the base body can include, for example, an impeller which rotates at least in sections in a damping fluid, for example in a grease and/or in an oil and/or in a liquid containing silicone. Moving such a damping element with the receiving section would be associated with major configuration problems and would also be error-prone and require intensive maintenance. The movement element, which is arranged on the receiving section, can, on the other hand, be mechanically simple, which means that there are no structural restrictions for the movement element as a result of moving along with it. It is essential that the movement element follows the movement of the receiving section. This allows the position of the receiving section to be reproduced by the movement element. On the other hand, the first and/or second damping force generated by the damping element can be applied to the receiving section, independent of the current position of the receiving section, as a result of this and the mechanical operative active connection between the moving element and the damping element. A particularly simple and at the same time flexible configuration of an inventive receiving device can thus be provided in this way.

An inventive receiving device may be further developed such that the moving element is a gear rack and the damping element comprises a gear wheel, wherein a length of the gear rack is adapted to a positional distance between the intermediate position and the receiving position and wherein for establishing the mechanical operative connection between the moving element and the damping element the gear wheel engages with the gear rack at a receiving portion located between the intermediate position and the receiving position. A gear rack as a moving element and a damping element comprising a gear wheel represented a particularly simple configuration of such a two-part damping device. The configuration of the gear rack and the gear wheel in accordance with the invention can be such that the gear wheel engages with the gear rack at a receiving section which is located between the intermediate position and the receiving position in order to produce the operative connection, that the damping device in particular generates the second damping force and thus acts on the receiving section. Furthermore, the configuration of the gear rack in accordance with the invention, with a length adapted to a position distance between the intermediate position and the receiving position, enables to particularly easy ensure that this second damping force is also generated over the entire movement of the receiving section from the intermediate position to the receiving position and that it can be applied to the receiving section.

Preferably, an inventive receiving device may be further developed in such a way that the gear wheel has tapered or at least substantially tapered driving teeth and/or that the gear wheel has driving teeth which are wider at their base than a circumferential distance between adjacent driving teeth. Tapered in the sense of the invention means in particular that the driving teeth have no plateau at their radial ends. The flanks of the driving teeth preferably form an acute angle at the radial ends of the driving teeth, i.e. an angle smaller than 90°. The edge at the radial end of a driving tooth can also be rounded. This configuration prevents the gear wheel of the damping element and the gear rack from tilting against each other. This is of particular importance in the configuration of an invention-made receiving device in which the gear wheel does not mesh with the gear rack over the entire movement of the receiving section from the rest position to the receiving position, but in which this engaging only begins during the movement, for example when the receiving section is in the intermediate position. A tilting of the gear wheel and the gear rack against each other at this beginning of the meshing engagement can be avoided or at least made more difficult by the configuration of the driving teeth according to the invention. A further measure to avoid or make it more difficult for such tilting to occur is the use of driving teeth which are wider at their base than a circumferential distance between adjacent driving teeth. In other words, the distance between the individual driving teeth is smaller than the extension of the driving teeth along the circumference of the gear wheel with the same radius. This wider base of the driving teeth, especially in comparison to conventional gear wheels, can also prevent or at least make it more difficult for the gear wheel and the gear rack to tilt against each other.

Further, according to a further development in an inventional receiving device, it may be provided that the gear rack has a main portion with a plurality of similar teeth and an inlet portion with at least one inlet tooth, wherein the inlet portion is arranged at one end of the gear rack which contacts the gear wheel at a receiving portion in the intermediate position or at least substantially in the intermediate position, and wherein the at least one inlet tooth is adapted to establish the mechanical operative connection between the gear rack and the gear wheel. Gear racks usually have a large number of similar teeth. This ensures that a gear engaging with the gear rack can always be provided with the same engaging environment regardless of the position of that engaging with respect to the gear rack. The main section of a gear rack of a device according to the invention can have exactly such a large number of similar teeth. In addition, such a gear rack is advantageously configured so that its length is adapted to a position distance between the intermediate position and the receiving position. In other words, such a gear rack does not extend over the entire distance covered by the receiving section during its extension movement. It is preferable that the gear wheel does not mesh into the gear rack during a receiving section between the rest position and the intermediate position, but does so between the intermediate position and the receiving position. This has the advantage already described above that the second damping force in particular can be provided particularly easily and can in particular be greater than the first damping force. It is essential that the meshing engagement of the gear wheel in the gear rack begins when the receiving section is in the intermediate position or at least essentially in the intermediate position during its extension movement. In order to facilitate this beginning of meshing engagement, an invented gear rack may preferably have an inlet section with at least one inlet tooth. The inlet section and thus the at least one inlet tooth is arranged at that end of the gear rack which, in the case of a receiving section, is arranged in the intermediate position or at least substantially in the intermediate position near the gear wheel or already contacts the latter. The at least one inlet tooth is configured in such a way that it is used to establish the mechanical connection between the gear rack and the gear wheel. Manufacture in the sense of the invention includes, in particular, facilitating the beginning of the meshing action of the gear wheel. This can be achieved, for example, by having at least one inlet tooth with a special geometry and/or shape that is different from the teeth in the main section. For example, at least one inlet tooth may be smaller than the teeth in the main section. Also a special surface condition, which for example can be particularly smooth and can be provided for example by a suitable coating, can be provided alternatively or additionally with the at least one inlet tooth. In addition, at least one of the inlet teeth may be intended to be made of a different material, such as a softer material than the teeth in the main section. In all configurations of the inlet section or of at least one inlet tooth, it can be achieved that, in particular, tilting and/or jamming of the gear wheel on the gear rack is prevented, in particular at the beginning of meshing engagement of the gear wheel in the gear rack. This enables to easier and safer for the gear wheel start engaging with the gear rack.

In particular, an inventive receiving device may be further developed in such a way that at least one inlet tooth has at least one of the following characteristics:
  in that the at least one inlet tooth has a lower height than the teeth in the main section of the gear rack,
  in that the at least one inlet tooth is formed asymmetrically, a first flank of the at least one inlet tooth facing the main section being flatter than a second flank facing away from the main section,
  in that a tooth spacing of the at least one inlet tooth to an adjacent tooth in the main portion is greater than a spacing of adjacent teeth of the main portion. This list is not exhaustive, so that the at least one inlet tooth may also have other characteristics which, in particular, facilitate the start of meshing engagement of the gear wheel with the gear rack. All of the features in the list have the same feature: they prevent the gear wheel from tilting and/or jamming on the gear rack. Preferably the at least one inlet tooth has several of these characteristics, especially all characteristics. For example, a lower height of the inlet tooth compared to the teeth in the main section may result in the gear wheel being rotated by this smaller tooth to a position where tilting and/or jamming of the gear wheel on one of the teeth in the main section of the gear rack is not possible or at least unlikely. The same can be achieved by asymmetrically configurating the shape of at least one inlet tooth. The flanks, i.e. the lateral boundary surfaces, of at least one inlet tooth are of different steepness, whereby in particular the flank facing the main section is flatter and the flank facing away from the main section steeper compared to the teeth in the main section. In this way, the gear wheel is first contacted by the steeper flank at the beginning of the meshing engagement and turned further. This steeper flank also increases the contact angle between the gear wheel and at least one inlet tooth, which in turn prevents or at least makes it more difficult for the gear wheel to jam and/or jam when it makes initial contact with the at least one inlet tooth and thus with the gear rack. The greater tooth spacing between the at least one inlet tooth and the first tooth of the main section enables to cause tilting and/or jamming of the gear wheel during the transition from the inlet section to the main section. The gear wheel is brought into a position by the at least one inlet tooth, in which an immediate beginning of the meshing engagement into the teeth of the main section is enabled. The larger tooth spacing between the at least one inlet tooth and the adjacent first tooth of the main section particularly ensures that the gear wheel actually assumes this position. Altogether, it can be provided by an inlet section with at least one inlet tooth which has one or more of these features that tilting and/or jamming of the gear wheel on the gear rack, in particular both at the actual beginning of the meshing engagement at the first contacting of the gear wheel on the inlet section and at the transition from the inlet section to the main section, is prevented or at least made more difficult.

According to another preferred further development, in the case of an inventional receiving device, it may also be provided that the inlet section has two or more inlet teeth. The inlet section may have two inlet teeth in particular preference. All the features and benefits described above for a inlet tooth can also be enabled and provided with two or more inlet teeth. Overall, the presence of two or more inlet teeth enables to even easier and safer ensure that the gear wheel is turned, in particular, at the transition from the inlet section to the main section of the gear rack, to a position which allows and ensures the smooth start of meshing engagement of the gear wheel with the teeth of the main section without tilting and/or jamming.

In addition, an invention-based receiving device can be further developed in such a way that the inlet teeth have a similar geometry to each other. A similar geometry in the sense of the invention means in particular that the geometries of the individual inlet teeth, analogous to similar triangles, are the same except for a different scale. For example, the flanks of the individual inlet teeth can be arranged at the same angles and the inlet teeth can differ from each other only by one general size. A particularly simple configuration of a device can thus be provided, since the geometry of the inlet teeth only has to be determined once.

Furthermore, in the case of a further development of a receiving device in accordance with the invention, it may be provided that the height of the individual inlet teeth in the inlet section increases in the direction of the main section, and in particular increases uniformly. Particularly with more than two inlet teeth, it may also be preferable for the height to increase continuously. In the sense of the invention, it is evenly understood that an increase in height is the same for different pairs of adjacent inlet teeth. By increasing the height in such a way, it can be achieved that the height of the inlet teeth approaches more and more the height of the teeth of the main section, the closer the respective inlet tooth is arranged in the inlet section to the main section. A particularly simple and smooth transition, particularly without tilting and/or jamming of the gear on the gear rack, from the inlet section to the main section can thus be provided for the engaging gear.

As an alternative or in addition, an invention-based receiving device may also be further developed in such a way that the tooth spacing of the individual inlet teeth in the inlet section decreases in the direction of the main section, and in particular decreases uniformly. Particularly with more than two inlet teeth, it may also be preferable for the tooth spacing to decrease continuously. Equally understood in the sense of the invention, it is that a decrease in the distance between teeth is the same for different pairs of adjacent inlet teeth. By such a decrease of the tooth distance it can be achieved that the tooth distance of adjacent inlet teeth approaches more and more a tooth distance of the teeth of the main section, the closer the respective pair of inlet teeth is arranged in the inlet section to the main section. This also allows the meshing gear wheel to provide a particularly simple and smooth transition from the inlet section to the main section, particularly without tilting and/or jamming the gear on the gear rack.

Furthermore, in the case of a receiving device according to an invention, it may be provided that the receiving device has a parallel running unit, wherein the parallel running unit has a first parallel gear rack and a second parallel gear rack, which are arranged parallel to one another and parallel to the first driving force and the second driving force at the receiving section, and further has a first parallel gear wheel and a second parallel gear wheel, wherein the parallel gear wheels are connected by an axis mounted in the base body and the first parallel gear wheel meshingly engages with the first parallel gear rack and the second parallel gear wheel meshingly engages with the second parallel gear rack, and further wherein the gear rack of the damping device is formed integrally with the first parallel gear rack. Such a parallel running unit ensures that the receiving section can be extended straight and without tilting and/or jamming out of the base body. For this purpose, the parallel running unit has two gear racks which are arranged parallel to each other on the receiving section. Furthermore, the two parallel gear racks are arranged in alignment parallel to the first and second driving force. This ensures that the extension movement of the receiving section and the two parallel gear racks also run parallel to each other. A parallel gear wheel engages with both parallel gear racks, the first parallel gear wheel engages with the first parallel gear rack and the second parallel gear wheel engages with the second gear rack. The two parallel gear wheels are connected to each other by a common axis, which is mounted in the base body. This ensures that the two gear wheels can only rotate simultaneously and in particular synchronously and thus only at the same rotational speed. This uniformity is also transferred to the respective parallel gear rack via the meshing engagement, so that the resulting linear movements of the two parallel gear wheels also occur simultaneously and, in particular, at the same speed. The arrangement of the two parallel gear racks on the receiving section ensures that it can be extended evenly from the base body without tilting and/or jamming. According to the invention, the gear rack of the damping device is configured to be integral with the first parallel gear rack. In other words, the gear rack is integrated into the first parallel gear rack. This enables to particularly easy ensure that the gear rack, as a moving element, follows the movement of the receiving section. In addition, this can simplify the configuration of a receiving device in accordance with the invention, since the integration of the gear rack into the parallel gear rack saves additional components, for example for fastening the gear rack to the receiving section.

Preferably, an inventive receiving device may be further developed such that the gear rack has a main portion with a plurality of similar teeth, the teeth in the main portion and the teeth of the first parallel gear rack being of the same shape and/or arranged in alignment with each other. In this way it can be achieved that the main section of the gear rack and the first parallel gear rack are of the same or at least similar shape. Particularly in the case of a configuration in which both equally shaped and aligned teeth are present in the main section of the gear rack and in the case of the first parallel gear rack, these teeth may even be formed in one piece with, in particular, continuous flanks. This represents a further simplification of the configuration of a device in accordance with the invention.

Another object of the present invention is, according to a second aspect of the invention, a method for damping a movement of a receiving portion of a receiving device for a vehicle interior according to the first aspect of the invention, wherein the damping device dampens a movement of the receiving portion from the intermediate position to the receiving position more than a movement of the receiving portion from the rest position to the intermediate position. Due to the use of a host device conforming to the invention after the first aspect of the invention, a process conforming to the invention brings the same advantages as have been explained in detail with respect to a host device conforming to the invention after the first aspect of the invention.

Further advantages, features and details of the invention result from the following description, in which examples of the execution of the invention are described in detail with reference to the drawings. The features mentioned in the claims and in the description may be essential to the invention either individually or in any combination. Elements with the same function and mode of action are provided with the same reference signs in the figures. They show schematically:

Figure 1:
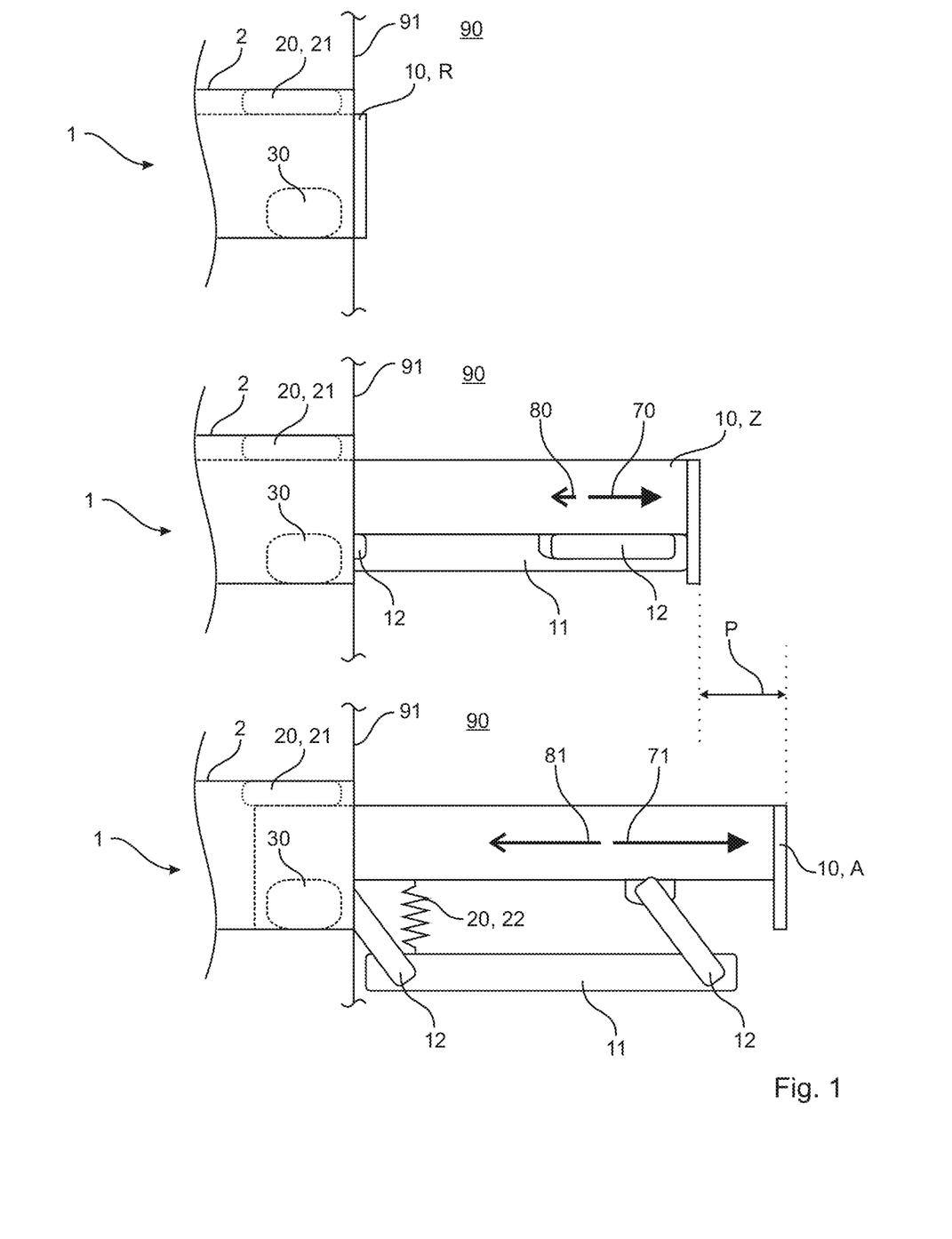
FIG. 1 Three views of an inventional receiving device with a receiving section in its rest position, its intermediate position and its receiving position FIG. 2 partial view of an ingenious receiving device, FIG. 3 a first parallel gear rack and a gear rack attached to it, FIG. 4 a detailed view of the parallel gear rack shown in FIG. 3, and FIG. 5 a parallel tooth edge and a gear of a damping device.

FIG. 1 shows three views of an inventionally configured receiving device 1. The various views differ in particular in the position of the receiving section 10 of the receiving device 1. The receiving section 10 is mounted in the base body 2 so that it can be moved between a rest position R (top view) via an intermediate position Z (middle view) to a receiving position A (lowest view). In particular in position A, pictured in the lowest view, the receiving section 10 protrudes from body 2 and objects such as beverage containers can be placed in it or picked up by it.

In the top view, the receiving section 10 is shown in its rest position R, in which it is essentially arranged interior the base body 2 of the receiving device 1. From the passenger compartment 90, in this position of receiving section 10, only a surface of the closure surface, in the form of a optical shutter, shall be visible from the passenger compartment 90 and, in this configuration, shall be slightly raised above a surface 91 in the passenger compartment 90. Alternatively, a flush configuration of the optical shutter with surface 91 is also conceivable. The device 1 according to the invention has a drive unit 20, which can in particular be divided into two parts and can comprise a first drive element 21 and a second drive element 22. This drive unit 20 can apply a first drive force of 70 and a second drive force of 71 to the receiving section 10, whereby the receiving section 10 is moved from its rest position R via the intermediate position Z to the receiving position A.

In this configuration of an invention-like receiving device 1, a first drive element 21 is provided which applies a driving force to the receiving section 10 over this entire movement.

The first drive element 21 can, for example, be configured as a spring element, for example as a roller spring. Between the rest position R and the intermediate position Z, this driving force of the first driving element 21 forms the first driving force 71. From the intermediate position Z, in this configuration of a holding device 1 according to the invention, a receiving floor 11 begins to fold downwards. For this purpose, the receiving floor 11 is mounted on webs 12 on the receiving section 10. The folding movement is driven by a second drive element 22 of the drive unit 20. The second drive element 22 can also include a spring element, for example a spiral spring as shown. Supporting one of the webs 12 on the base body 2 also results in a force component of the driving force of the second drive element 22, which is oriented in the direction of the movement of the receiving section 10. Together with the driving force of the first drive element 21, this force component forms the second driving force 71, which is applied to the receiving section 10 between the intermediate position Z and the receiving position A. In other, alternative configurations of a receiving device 1 in accordance with the invention, it may be provided that the first drive element 21 alone and only the first drive force 70 and the second drive element 22 alone and only the second drive force 71 are generated by the first drive element 21 and apply this to the receiving section 10 in each case.

FIG. 1 clearly shows that the second driving force 71, in particular due to the interaction of the first 21 and the second driving element 22, is greater than the first driving force 70. In order to avoid or prevent the receiving section 10 from rushing out, in particular over the position distance P and/or shortly before reaching the receiving position A, a receiving device according to invention 1 has a damping device 30 which is configured to apply a first 80 and a second damping force 81 to the receiving section 10. The receiving section 10 is acted upon by the damping forces 80, 81 against the driving forces 70, 71. This reduces an effective resulting force which drives the movement of the receiving section 10, thereby damping this movement. The invention essentially provides that the second damping force 81 is greater than the first damping force 80. In particular, the first damping force 80 may even be zero, so that the movement of the receiving section 10 between the rest position R and the intermediate position Z is at least substantially undamped. Due to the larger second damping force 81, the larger second driving force 71 is taken into account in particular. This can prevent the receiving section 10 from being blown out to its receiving position A. The size of the second damping force 81 is preferred so that the difference between the first and the second driving force 70, 71, i.e. the resulting overall increase in the driving force, is compensated. In this way it can be achieved that over the entire extension movement of the receiving element 10 an at least substantially uniform resulting force acts on the receiving element 10. A particularly even extension, in particular with uniform, preferably constant, speed of the receiving section 10 can thus be provided.

Figure 2:
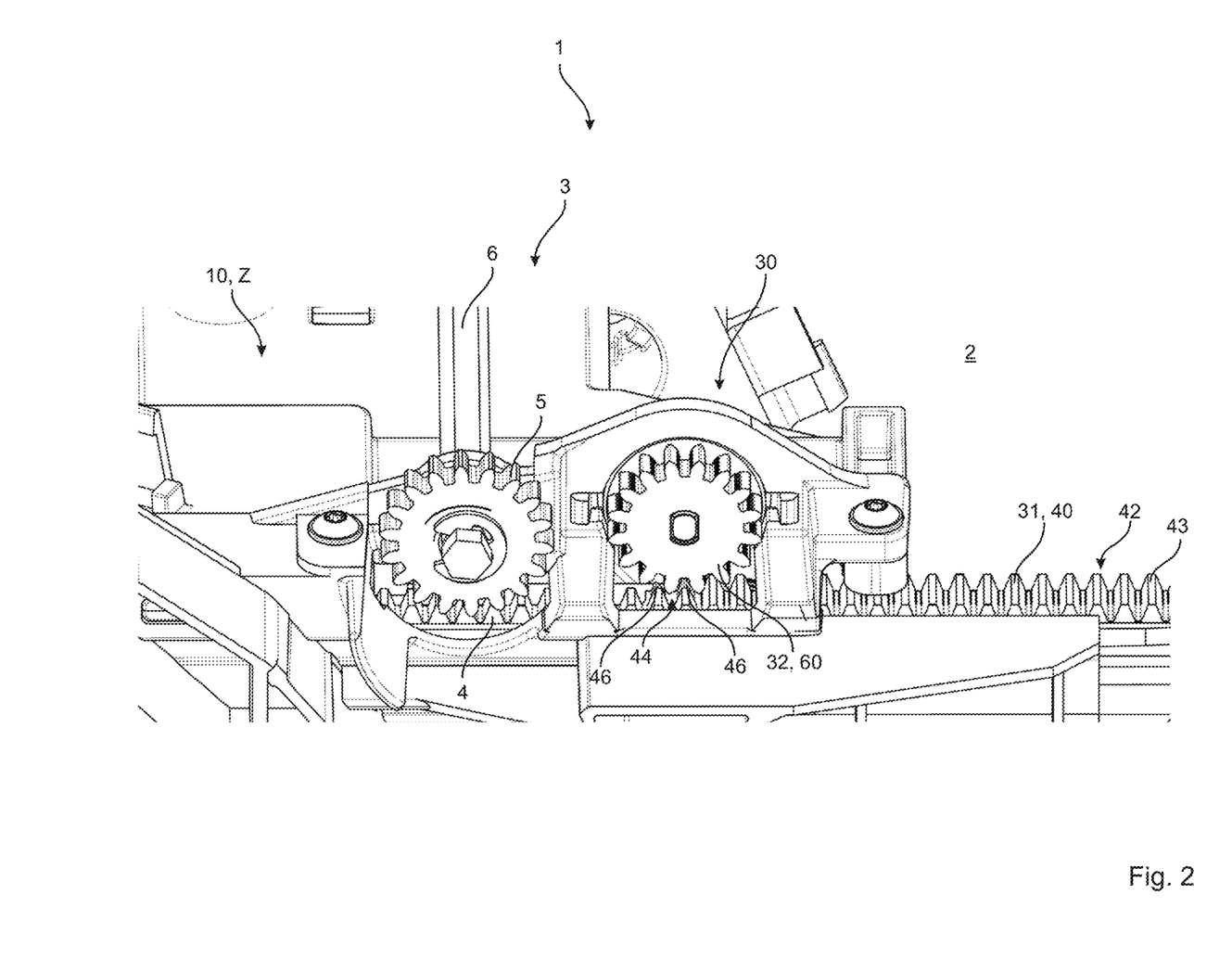
Figure 3:
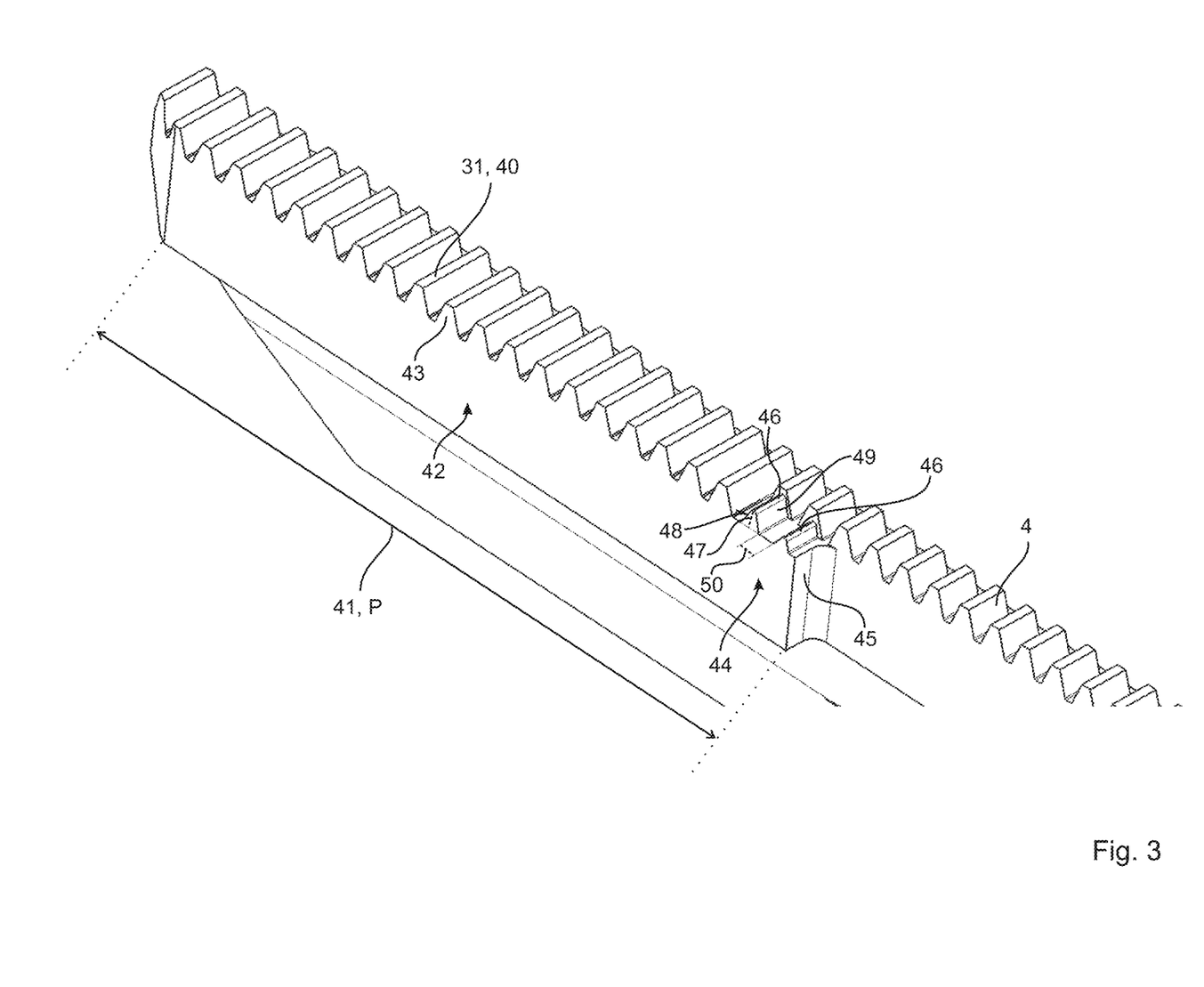
Figure 4:
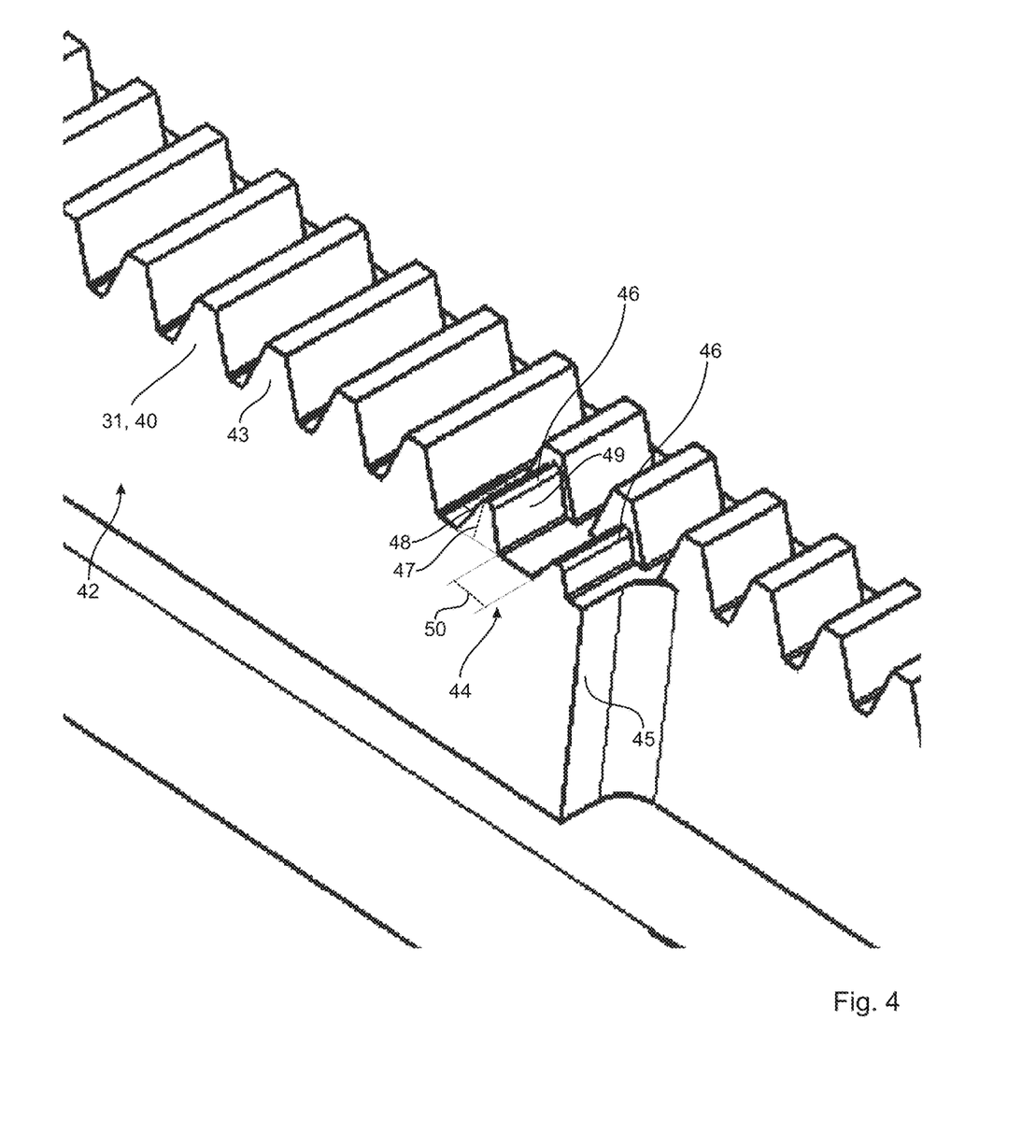
Figure 5:
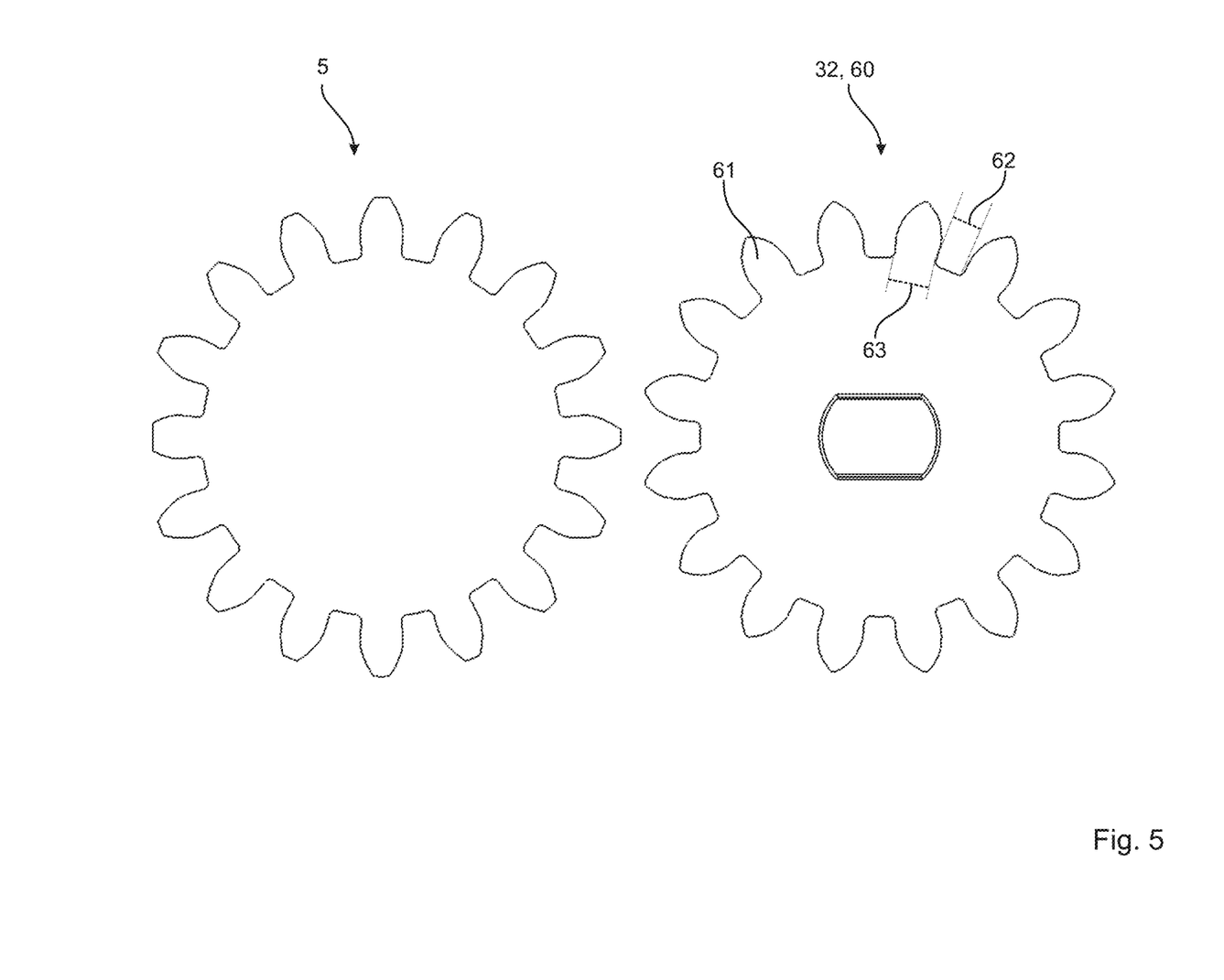

FIG. 2 shows a partial view of a receiving device 1 in accordance with the invention, whereby in particular a parallel running unit 3 arranged interior the base body 2 and a damping device 30 are shown. FIGS. 3, 4 and 5 each show detailed views of individual elements of this configuration, so that FIGS. 2 to 5 are described together in the following.

The illustrated configuration of an inventive receiving device 1 has a parallel running unit 3, which is partially pictured in FIG. 2. A first parallel gear wheel 5 engages with a first parallel gear rack 4. The first parallel gear wheel 5 is mounted via an axis 6 in the base body 2. At the opposite end of axis 6 there is a second parallel gear wheel which engages with a second parallel gear rack (not shown). Both parallel gear racks 4 are arranged on the receiving section 10, which is shown in its intermediate position Z, and thus follow its movement. Axis 6 ensures that the two parallel gear wheels 5 can only rotate synchronously, which automatically ensures a uniform linear movement of the two parallel gear racks 4 and thus also of the receiving section 10. Tilting and/or jamming of the receiving section 10 during its movement from the rest position R (not shown) via the intermediate position Z to the receiving position A (not shown) can thus be prevented.

Furthermore, FIG. 2 shows a damping device 30 comprising in particular a moving element 31 and a damping element 32. The movement element 31 is configured as a gear rack 40, which is arranged on the receiving section 10. In this way, analogous to the parallel gear racks 4, it can be provided that the movement element 31 follows a movement of the receiving section 10. In this configuration, the gear rack 40 is even configured in one piece with the first parallel gear rack 4, as shown in FIGS. 3 and 4. The teeth 43 of the gear rack 40 are of the same shape in at least one main section 42 of the gear rack 40 and are arranged in alignment with the teeth of the first parallel gear rack 4. A particularly compact and structurally simple configuration of a device 1 according to the invention can thus be achieved. Furthermore, the damping element 32 comprises a gear wheel 60 which engages with the gear rack 40 at least between the intermediate position Z and the receiving position A. The gear wheel 60 is provided with a gear rack 40, which is provided with a toothed wheel 60. A second damping force 81 (not shown) is generated by the damping element 32 and the meshing engagement via the gear rack 40 acts on the receiving section 10. For generating the damping force, for example, an impeller may be provided which is mechanically operatively connected to the gear wheel, for example via a common axis, and which rotates at least in sections in a damping fluid, for example in a grease and/or in an oil and/or in a liquid containing silicone. Furthermore a length 41 of the illustrated gear rack 40 is adapted to a position distance P (see FIG. 1). As the meshing engagement of the gear 60 into the gear rack 40 in the shown configuration takes place only between the intermediate position Z and the receiving position A (not illustrated) of the receiving section 10, it is particularly easy to achieve that the second damping force 81 is greater than a first damping force 80 (not illustrated), which in this case is zero.

In FIG. 2 the receiving section 10 is shown in its intermediate position Z. This means that the meshing engagement of gear 60 in the gear rack 40 just begins. To facilitate this, the gear rack 40 has an inlet section 44 at one end 45, where engaging begins, in which two inlet teeth 46 are arranged. This is shown in particular in FIG. 3 and again enlarged in FIG. 4. The two inlet teeth 46 have a similar geometry, i.e. they differ only in their size or in a scale. A height 47 of the inlet teeth 46 increases in the direction of the main section 42. Further, the inlet teeth 46 are asymmetrically formed, wherein a first flank 48 facing the main portion 42 is flatter than a second flank 49 facing away from the main portion 24. Another feature of inlet section 44 is that tooth spacings 50 are increased compared to the spacings of adjacent teeth 43 in main section 42, with the size of tooth spacings 50 decreasing in the direction of main section 42. Altogether, the values of height 47 and tooth spacing 50 approach the values that these values also show in main section 42. The inlet section 44 and in particular the special shape of the inlet teeth 46 facilitate for the gear wheel 60 to start engaging with the gear rack 40. A mechanical active connection between the gear rack 40 or the moving element 31 and the gear 60 or the damping element 32 can thus be provided and, in particular, facilitate without fear of the mechanical components involved being tilted against each other.

This can be further supported by the special configuration of the gear wheel 60 shown in FIG. 5. For comparison, the first parallel gear wheel 5 is also shown in FIG. 6. It is clearly visible that the driving teeth 61 of gear 62 are pointed and, in particular, do not have a plateau at their radial ends, as is the case with the teeth of parallel gear 5. The driving teeth 61 are also wider at their base 63 than a circumferential distance of 62 adjacent driving teeth 61. These configuration measures can also prevent or at least make it more difficult for the gear wheel 60 to tilt against the gear rack 40, especially when meshing engagement begins.

LIST OF REFERENCE CHARACTERS

1 Receiving device
2 Base body
3 Parallel running unit
4 first parallel gear rack
5 first parallel gear wheel
6 axis
10 Receiving section
11 Repository shelf
12 Web
20 Drive unit
21 first element of propulsion
22 second drive element
30 Damping device
31 Movement element
32 Vapour element
40 Gear rack
41 Length
42 Main section
43 Tooth
44 Inlet section
45 End
46 Inlet tooth
47 Height
48 first flank
49 second flank
50 Tooth distance
60 Gear wheel
61 Driving tooth
62 Distance
63 Basis
70 first driving force
71 second driving force
80 first damping force
81 second damping force
90 Interior of the vehicle
91 Surface
A Acceptance position
PP Position distance
R Rest position
I Intermediate position

The invention claimed is:

1. A receiving device for a vehicle interior, having
a receiving section for receiving objects in a receiving position of the receiving section,
a base body in which the receiving section is arranged in a rest position of the receiving section,
a drive unit for moving the receiving section from the rest position via an intermediate position into the receiving position,
in which the receiving section projects from the base body,
the drive unit applying a first drive force to the receiving section for moving from the rest position into the intermediate position and applying a second drive force to the receiving section for moving from the intermediate position into the receiving position,
the first drive force being smaller than the second drive force,
further comprising a damping device for applying a second damping force against said second drive force to said receiving section, said second damping force being greater than zero,
wherein the damping device is configured in two parts and has a movement element for following a movement of the receiving section and a damping element for generating the second damping force,
the movement element being arranged on the receiving section and thereby following a movement of the receiving section, and the damping element being arranged in the base body and being mechanically operatively connected to the moving element in such a way that the damping element applies the second damping force generated to the receiving section,
wherein the movement element is a gear rack and the damping element comprises a gear wheel, a length of the gear rack being adapted to a position distance between the intermediate position and the receiving position, and, in order to establish the mechanical operative connection between the movement element and the damping element, the gear wheel at a receiving section, which is located between the intermediate position and the receiving position, engages with the gear rack,
wherein the gear rack comprises a main portion having a plurality of similar teeth and an inlet portion having at least one inlet tooth, the inlet portion being disposed at one end of the gear rack, which, at a receiving section in the intermediate position or at least substantially in the intermediate position, contacts the gear wheel, and the at least one inlet tooth being configured for producing the mechanical operative connection between the gear rack and the gear wheel.

2. The receiving device according to claim 1, wherein the drive unit has a first drive element comprising a first spring element and a second drive element comprising a second spring element, the first drive element acting on the receiving section at least with the first drive force and the second drive element acting on the receiving section with the second drive force.

3. The receiving device according to claim 1, wherein the second damping force compensates or at least substantially compensates for the increase in force from the first drive force to the second drive force.

4. The receiving device according to claim 1, wherein the gear wheel has tapered or at least substantially tapered driving teeth and/or in that the gear wheel has driving teeth which are wider at their base than a circumferential spacing of adjacent driving teeth.

5. The receiving device according to claim 1, wherein the at least one inlet tooth has at least one of the following features:

in that the at least one inlet tooth has a lower height than the teeth in the main portion of the gear rack, in that the at least one inlet tooth is configured asymmetrically, a first flank of the at least one inlet tooth facing the main portion being flatter than a second flank facing away from the main portion, in that a tooth spacing between the at least one inlet tooth and an adjacent tooth in the main portion is greater than a spacing between adjacent similar teeth in the main portion.

6. The receiving device according to claim 1, wherein the inlet portion has two or more inlet teeth.

7. The receiving device according to claim 6, wherein the inlet teeth have a similar geometry to one another.

8. The receiving device according to claim 6, wherein the height of the individual inlet teeth in the inlet section increases in the direction of the main section.

9. The receiving device according to claim 6, wherein a tooth spacing of the individual inlet teeth in the inlet section decreases in the direction of the main section.

10. The receiving device according to claim 1, wherein the receiving device has a parallel running unit, the parallel running unit having a first parallel gear rack and a second parallel gear rack, which are arranged parallel to one another and parallel to the first drive force and the second drive force on the receiving section, and furthermore having a first parallel gear wheel and a second parallel gear wheel, the parallel gear wheels being connected by an axis mounted in the base body and the first parallel gear wheel meshingly engaging in the first parallel gear rack and the second parallel gear meshingly engaging in the second parallel gear rack, and furthermore the gear rack of the damping device being formed integrally with the first parallel gear rack.

11. The receiving device according to claim 10, wherein the gear rack has a main section with a multiplicity of similar teeth, the teeth in the main section and the teeth of the first parallel gear rack being of the same shape and/or arranged in alignment with one another.

* * * * *